May 7, 1940.  O. W. TIMM  2,199,681

AIRPLANE

Filed April 15, 1939  4 Sheets-Sheet 1

INVENTOR.
Otto W. Timm

May 7, 1940. O. W. TIMM 2,199,681
AIRPLANE
Filed April 15, 1939 4 Sheets-Sheet 3

INVENTOR.
Otto W. Timm

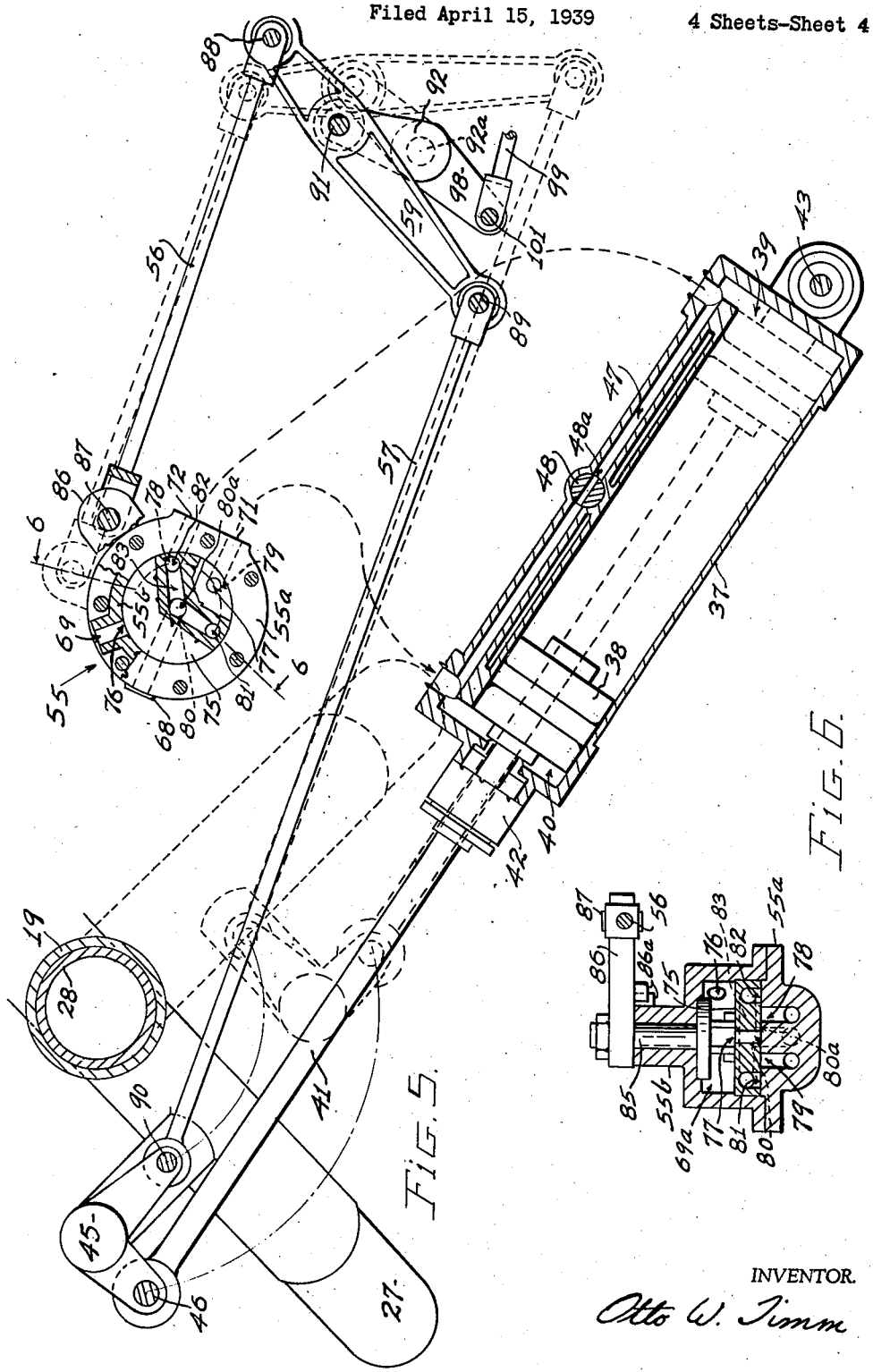

Patented May 7, 1940

2,199,681

UNITED STATES PATENT OFFICE 2,199,681

AIRPLANE

Otto W. Timm, Glendale, Calif.

Application April 15, 1939, Serial No. 268,152

18 Claims. (Cl. 244—50)

My invention has to do with aircraft and while it is applicable to a wide variety of types it is more particularly concerned with airplanes having a level attitude on the ground and/or embodying a landing gear which includes a wheel mounted so that it may turn or be turned directionally.

A particular object of the invention is to provide an airplane embodying a landing wheel which while mounted for castering is fully under control of the operator at all times.

Another object of the invention is to provide an airplane having a level or cruising attitude when on a landing surface and which may be controlled directionally when rolling or taxiing.

While my invention applies to large and small types alike it will be understood that a large transport embodying a single wheel forward of the center of gravity involves great stresses imposed upon such wheel and manual steering is difficult if not quite impossible at times.

It is therefore another object of the invention to provide an airplane which may be steered on the ground with minimum effort and attention upon the part of the operator.

Another object of the invention is to provide that the usual rudder controls will, upon contact of the landing surface, become effective to more positively control the craft directionally.

While freely castering wheels have been employed to the rear of the center of gravity, in place of the original tail skid, the provision of such a wheel forwardly of the center of gravity may prove more dangerous than beneficial where proper control is not provided, and, such a wheel contacting the ground under unfavorable conditions is even more likely to caster too freely or give rise to considerable shimmer.

It is therefore another object of the invention to provide a wheel of the class described which automatically lands dead ahead but which upon contacting a landing surface, will turn to the direction produced by any combined forward motion and drift, and which wheel while so turning is under control to a degree conducive to safety, and to a degree not heretofore provided.

My invention provides several other advantages and certain multiple functions on the part of certain members, all of such nature that to further bring forth these objects and advantages will first require a complete description of an airplane embodying the features of the invention.

In the accompanying drawings I have illustrated one practical embodiment of my invention.

Figure 1 of these drawings is a plan view of an airplane.

Figure 5 is a view on a larger scale than Figure 4 showing parts, hereinafter known as the cylinder and valve respectively, in longitudinal section and showing certain associated parts in elevation.

Figure 6 is a detail vertical section of the valve seen on line 6—6 of Figure 5.

Figure 1:
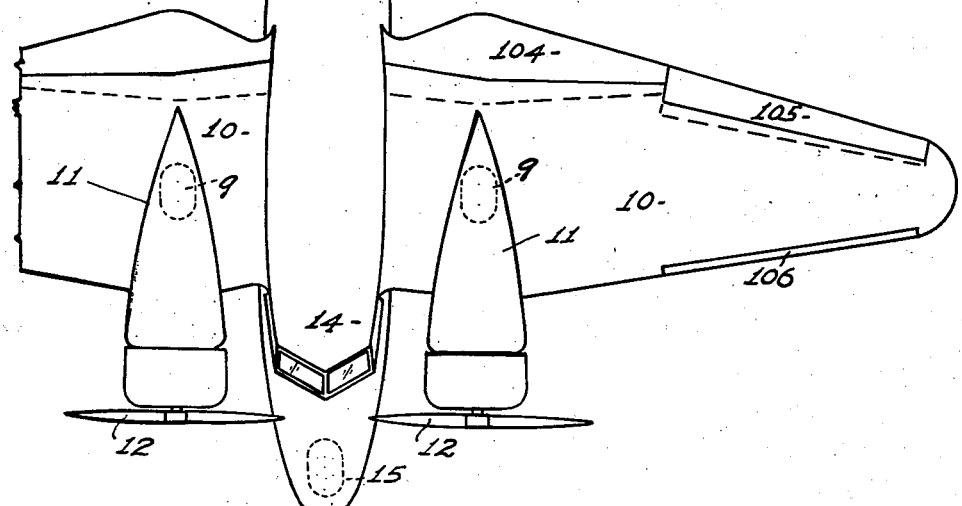

In carrying out my invention in the embodiment illustrated I provide a single landing wheel forwardly of the center of gravity of the airplane, and a pair of directionally stable landing wheels to the rear of the center of gravity. This single wheel, known as the nose wheel, is mounted to caster in a vertically ranging but slightly inclined member forming a part of the frame, so that the wheel has the proper caster which tends to keep it turned in the direction in which the airplane is inclined to move along a landing surface.

I hold that free castering of such a wheel is not conducive to proper control and may prove dangerous although I recognize that an airplane when landing other than dead ahead should be allowed to turn, or should be turned accordingly, upon contacting the landing surface.

Accordingly I provide for controlled movement or castering by providing a hydraulic device which limits castering. This, in the embodiment illustrated, is in the form of a hydraulic plunger which is connected to the fork of the nose wheel, and which reciprocates in a relatively fixed cylinder. The plunger divides the cylinder into a left-turn chamber and a right-turn chamber respectively. When the wheel turns for a right turn the right-turn chamber is increased in volume and the left-turn chamber is diminished in volume, and vice-versa for a left-turn movement of the wheel.

The chambers are interconnected by a by-pass port which permits fluid to be displaced from one chamber to the other to thereby permit the wheel to turn of its own accord. This port however is limited so that dangerously rapid castering is not possible, and so that the wheel will not shimmer. While in the embodiment illustrated this hydraulic "snubbing" of free castering tendencies is applied to a forward or nose wheel, it has equal advantages in the usual tail wheel which has come to replace the original tail skid. It will appear hereinafter that the particular airplane illustrated while designed with comfort, stability, and efficiency in view, is peculiar in that it imposes certain characteristic loads and inertia stresses forwardly of the center of gravity and which are taken care of by providing both automatic and manual control over the movements of the nose wheel, and by providing a nose wheel and control therefore, capable of operating as required despite the load imposed upon it particularly in the larger sized craft.

Where my invention is applied to light craft the combination of the hydraulic snubbing device to prevent free uncontrolled castering may be sufficient although in heavier craft I provide both automatic and manual control over and above the mere snubbing. Thus, I provide that when the wheel, thru a combination of forces, tends to turn to the right, it is allowed to turn slightly accordingly, but upon turning a certain degree is automatically prevented from turning further in that direction unless the pilot shall have determined that further turning is permissible.

The invention provides, in the case of larger craft particularly, a source of hydraulic fluid under pressure which at any time may, at the will of the pilot be directed into either cylinder selectively, and which when the wheel turns voluntarily is directed into the then decreasing-volume chamber to stop or retard further castering.

This automatic device for stopping or retarding natural castering, by the addition of a certain control member, takes on the added function of serving as a steering mechanism so that in taxiing or the like the wheel may be positively turned in either direction or may even be turned in direct opposition to its natural tendencies.

Thus the valve which is provided to direct hydraulic fluid into either of the said chambers is connected with steering controls so that at any time that the wheel is in rolling contact with a landing surface, the valve may be operated to direct fluid into either chamber selectively. To further facilitate steering the valve is so connected with the usual rudder controls that the rudder and wheel may be turned simultaneously. However, the rudder is used in flight while the wheel is not. In fact the invention provides a peculiarly balanced centering device, which immediately the wheel has left the ground, operates to move the wheel to dead-ahead position so that it is correct for the next landing.

The aforesaid bye-pass port permits of this centering of the wheel. Provision is made for discontinuing the supply of hydraulic fluid immediately the wheel has left the ground so that the rudder may be operated as usual in the air without having any effect upon the wheel.

The means for discontinuing the supply of fluid under pressure is also the means for providing such supply again immediately the wheel contacts a landing surface, so that as soon as a landing surface is contacted the steering control, previously operative only on the rudder, then becomes effective on the dirigible wheel as well. This provides that should steering as such not be resorted to while landing, the wheel will be allowed to caster automatically but only until the controls shall operate automatically, or shall be operated by the pilot, to retard or stop undue turning in either direction.

The peculiar combination of rudder control, wheel control, and automatic centering device for the wheel, provides that the rudder may be turned as required prior to landing to thereby predetermine how the dirigible wheel and the craft as a whole will turn upon landing, and while the act of moving the rudder in the air has no effect on the wheel, such act will result in the wheel turning accordingly and automatically by hydraulic pressure as soon as the landing surface is contacted.

Figure 2:
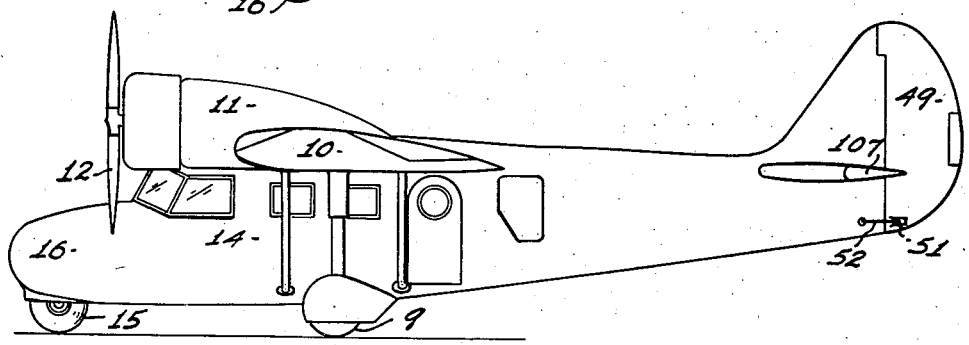
Figure 2 is a view in side elevation thereof.
Figure 3:
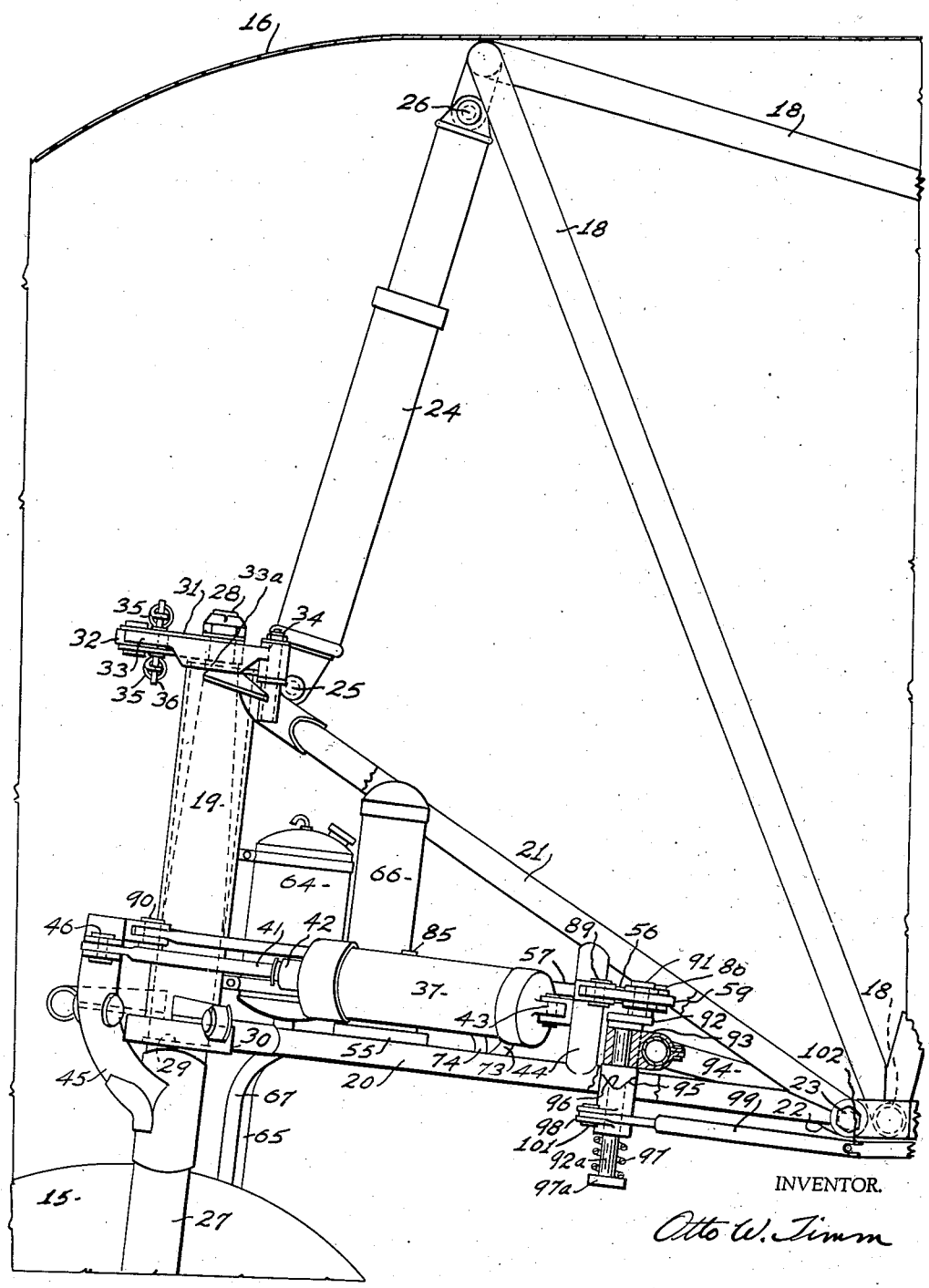
Figure 3 is a view in side elevation, on a larger scale than Figures 1 and 2, of a part of the landing gear showing the mechanism for controlling the craft directionally.

In the drawings the airplane shown in Figures 1 and 2 is of the high wing type in which the wings 10, 10 each support a corresponding engine nacelle 11, 11. These nacelles are closely spaced to require less trimming in event that one motor goes dead. By having the propellers 12, 12 well forward of the wings and forward of the cabin 14, this close spacing of the engine centers is made possible. Below the propellers, forwardly of the cabin, and well forward of the center of gravity, there is provided the nose wheel 15, enclosed by a nose 16. This nose is a low forward extension of the fuselage and is sufficiently low to permit the aforesaid close spacing of the propellers' centers, and houses the mechanisms for centering and controlling the wheel 15. The fuselage frame extends into this nose in the form of tubular frame members such as 18, 18, and these frame members are fixed parts of the main structure.

A triangular nose frame, is provided for swivelly supporting the nose wheel 15 and the controls about to be described.

This frame begins at the extreme forward end in a vertically directed sleeve 19. From the lower portion of this sleeve a pair of rearwardly diverging struts 20, 20 extend horizontally toward the main fuselage frame members 18, 18. From the upper end of the sleeve 19 another pair of rearwardly diverging struts 21, 21 incline downwardly to connect with the struts 20, 20 just forwardly of the fuselage frame. These struts provide a light-weight rigid triangular frame which terminates at the rear in a pair of spaced bearings 22. Each bearing is pivotally secured to a corresponding part of the fuselage frame as by the pins 23. A shock strut 24 is provided connecting the said triangular nose frame and particularly the sleeve 19 as at 25, with the extreme upper and forward portion of the fuselage frame as at 26. Thus the nose frame is mounted for controlled generally vertical movement and the weight which is forward of the center of gravity of the airplane as a whole is taken by the shock strut 24.

The wheel 15 is freely rotatable on a fixed axle 27a and this axle is held by a wheel fork 27. The fork continues upwardly above the wheel in a fork-shaft 28 which passes thru the sleeve 19. The shaft 28 is free to turn in the sleeve 19; the shaft providing a collar 29 abutting an axial thrust bearing 30 carried at the lower end of the sleeve.

This shaft passes entirely thru the sleeve and where it emerges from the upper end of the sleeve it is provided with a centering arm 31 terminating forwardly in a roller 32. This roller is held centered between a pair of spaced centering cams 33, 33 spaced one to each side of the sleeve 19. Each cam is pivoted at its rear end as at 34 to the sleeve 19 and they are urged toward each other, to clamp the roller 32 between them, thru the action of tension springs 35, 35. These springs are each connected at each end to lugs 36 provided on the cams. An intermediate portion of each cam, indicated at 33a, is disposed to abut the corresponding side of the sleeve 19. Thus the springs tend to center the wheel at all times, but the springs are limited as to their tension so as to permit castering of the wheel 15. It is a peculiarity of these cams that immediately the wheel moves from dead ahead position the cam against which the roller 32 is then bearing remains effective to yieldably resist movement of the wheel while the other cam then abuts the sleeve and is rendered totally ineffective. This makes the centering device decidedly accurate and does not promote shimmering as would be the case were one spring-urged cam allowed to partially oppose the other spring-urged cam. Actually, while not apparent from the drawings, a slight clearance is provided between the sleeve and the cams when the wheel is in dead-ahead position but this clearance is insufficient to allow the wheel to shimmer, and yet it is sufficient to bring the wheel to practically dead center when same is out of contact with a landing surface.

The hydraulic cylinder is indicated at 37; the plunger in said cylinder at 38, and the right-turn and left-turn chambers at 39 and 40 respectively. A plunger rod 41 extends from the plunger out thru a stuffing box 42 of the cylinder to the steering fork. Cylinder 37 is pivoted as at 43 at its rear end to a vertical brace 44 of the nose frame; the pivot 43 being capable of taking the thrust while allowing the forward end of the plunger rod to describe an arc. The wheel fork is provided with a vertically ranging steering arm 45 positioned normally on a line corresponding to the axis of the corresponding forwardly converging struts of the nose frame so that the plunger and its rod are mainly within the confines of the nose frame and so that the thrust of the plunger is properly taken up by the frame.

The forward end of the plunger rod is pivotally connected as at 46 to the steering arm 45. The cylinder is provided with a bye-pass channel 47 connecting the chambers with each other and in this channel there is provided a valve 48; which valve once adjusted is allowed to remain with a given opening 48a.

With the cylinder chambers charged with incompressible fluid, the wheel 15, while mounted so that it will caster, is retarded in castering by reason of having to move the plunger to displace fluid from one cylinder thru the port 48a into the other cylinder. Thus when the airplane lands with a side drift or when other forces act to cause the wheel to tend to caster, the said wheel may do so but only at a rate permitted by the size of the valve port. This port also acts to prevent rapid oscillation or shimmering of the wheel under natural forces.

The combination of parts described provides a landing gear well suited to absorbing landing shocks, and permitting the airplane, upon landing, to turn toward and travel in the general direction represented by the combination of forces acting upon it, and, the combination described provides that the nose wheel will invariably center in the air and be in dead-ahead direction when landing. Also the airplane is so designed that the air streams from the propeller are particularly effective on the rudder 49 and the reaction of the rudder may be employed to influence the castering action of the nose wheel.

It will be understood that the wheel 15 requires proper "castering angle" on the part of the sleeve 19. This is determined by the adjustment and function of the shock strut 24, which is arranged so that when the fuselage is static the imposed weight will compress the strut to a degree where the nose frame is moved in its pivots, relative to the fuselage frame, to incline the sleeve 19 and the wheel shaft, at the proper angle.

While the strut 24 is arranged to give this proper angle to the nose frame, all parts are arranged so that the airplane body assumes a level attitude on the ground, as shown particularly in Figure 2. Such attitude is practically that of cruising attitude, with the wings having a corresponding angle of incidence. While any well designed airplane, even those dating back to the old "tricycle landing gears" will take off automatically from level or cruising attitude without resort to flaps or the like, my invention provides for automatic increase of the angle of attack of the wings during take-off, and without thought on the part of the operator. It will be observed from Figure 2 of the drawings that the landing wheels 9, 9 are practically under the center of lift of the wings while the shock strut 24 is under considerable load. Therefore this strut has considerable available lifting effort stored therein where the airplane is static on the ground. Now as soon as forward movement begins and the usual cruising angle of incidence of the wings becomes effective, the load on the strut 24 is reduced and the strut becomes quite effective in relatively raising the nose to increase the effective angle of the wings. The result is that the strong shock-strut 24 is effective in promoting quicker takeoff than were the elevation of the nose wheel not subject to change.

For controlling the rudder the usual rudder bar 50 is provided, this being interconnected with the rudder horn 51 by the cables 52. The combination of parts so far described provides a level attitude on the ground and the hydraulically snubbed nose wheel provides the required automatic limited directional turning of the craft when landing, and the hydraulic device provides that turning will not be disastrously sudden and that the wheel will not shimmer. The castering angle of the wheel 15, when the shock strut 24 has been compressed by the full imposed weight, combines with the centering device and the valve port 48a, to cause the wheel to assume a straight ahead position as soon as all forces act accordingly.

It will be apparent now that the described combination attains several objects of the invention and is a complete operative combination. In large size craft particularly it is advantageous, I have found, to provide limits to the degree to which the wheel 15 may turn. This is accomplished thru the provision of a hydraulic pump 54, a control valve 55, and links 56 and 57 respectively cooperating with a pivot bar 59 to provide that hydraulic pressure shall be applied to stop the plunger whenever the wheel shall have turned a given degree in either direction. These last named parts, and parts about to be described in connection therewith are shown in application Serial No. 264,395. In applying these parts to the airplane certain peculiar changes are required so that they cooperate as required with the centering mechanism and with the hydraulic snubbing means.

The pump is mounted on a pad 60 carried by the wheel fork and this pump has a driving gear 61 meshing with a gear 62 fixed to and rotating with wheel 15. Thus the pump operates only when the wheel 15 is in rolling contact with a landing surface. A supply of hydraulic fluid is carried in a low pressure receiver 64 while a suitably long and flexible hose 65 provides for supplying low pressure fluid to the suction side of the pump. A high pressure accumulator 66 is also carried by the nose frame and this is connected by a hose 67 to receive high pressure fluid from the pump. The valve 55 provides a low presure outlet or vent branch 68, and a high pressure inlet branch 69, respectively. The hose 65 leads from the branch 68 of the valve to the suction side of the pump while the receiver 64 is a part of the low pressure system. The hose 67 leads from the high pressure or discharge side of the pump to the inlet branch 69 of the valve; the accumulator 66 being interposed in this high pressure system. An adjustable high pressure relief valve 70 connects the said high pressure system with the low pressure system between the valve and the accumulator. The pump, as will appear hereinafter, requires a certain peculiar adjustment to function in connection with the previously described parts.

The valve 55 includes a left turn branch 71 and a right turn branch 72. A flexible conduit 73 leads from the right turn branch 72 to the right turn chamber of the cylinder, while a second high pressure flexible conduit 74 leads from the left turn branch 71 of the valve to the left turn chamber of the cylinder.

The valve proper is comprised of a body 55a, a bonnet 55b, and a disc 75 interposed between the body and the bonnet. The high pressure inlet branch 69 is provided in the bonnet of the valve and leads into the interior space 69a of the bonnet thru a port 76. The disc is provided with a thru port 77 and the body is provided with a right turn port 78 leading to the right turn branch 72, and with a left turn port 79 leading to the left turn branch 71. The thru port 77 is arranged to register, upon proper movement of the disc, with either port 78 or 79 to admit high pressure fluid to either as required. In the neutral or closed position in which the disc is shown in Figure 6, the high pressure or thru port 77 connects with neither and is sufficiently spaced from either port 78 or port 79 so that appreciable movement of the disc may take place before registration begins. This degree of movement is such as to permit the wheel 15 to caster a limited degree in either direction before high pressure fluid is admitted by the valve to the cylinder.

The valve body provides the low pressure outlet port 80 which leads to the low pressure outlet branch 68 and this port is at the center of rotation of the disc to register with a corresponding port 80a in the disc. The disc is provided with a left turn vent port 81 and a right turn vent port 82, both of which communicate with the central port 80a of the disc by corresponding channels 83, provided within the structure of the disc. Ports 77, 78, 79, 81 and 82 are all arranged with port 77 in an arc so that when the high pressure port 77 registers with right turn port 78, for example, the left turn port 79 is registered with the left turn vent port 81 to vent the left turn chamber of the cylinder while high pressure fluid is being admitted to right turn chamber, and vice-versa.

The disc is turned by a valve stem 85 which terminates above the valve in a lever 86. This lever is connected pivotally as at 87 to the link 56 and the link is connected pivotally as at 88 to one end of bar 59. The other end of bar 59 is connected pivotally as at 89 to the link 57 and this link is connected pivotally as at 90 to the steering arm 45.

The bar 59 is mounted on a pivot 91 which for the present will be regarded as a fixed pivot point. The wheel therefore in turning acts to move the valve disc. When the wheel 15 casters voluntarily to the right, for example, the one end of bar 59 is moved forward and the other end is moved rearwardly which moves the valve disc to where the high pressure port 77 begins to register with the left turn port 79. This subjects the left turn chamber of the cylinder to high pressure, as determined by the pressure for which the relief valve 70 is set, and thus the plunger is ordinarily stopped from further movement so that the wheel 15 stops turning. Were the valve disc to move far enough the high pressure fluid would flow into left turn chamber and move the wheel 15 back toward dead ahead or neutral position but since this would act to move the valve disc accordingly the supply of high pressure fluid would again be shut off before the wheel would have reached dead ahead position. What actually takes place is that when the wheel moves toward the right it acts to open the valve just enough to where the high pressure fluid retards and gradually stops the wheel from further movement. During all this time the port 48a is of course bye-passing fluid. This means that the capacity of the pump must be such as to maintain a suitable pressure despite the bye-pass port 48a. However, if the forces acting to turn wheel 15 are overly severe such that it would be inadvisable to too suddenly retard the automatic castering movement of the wheel, these same forces may act to continue to move the plunger in a right turn against the high pressure fluid, with the result that the high-pressure relief valve will be opened thereby.

Thus the parts cooperate with a certain proper setting of the high pressure relief valve to provide that the wheel 15 may turn under extraneous forces a limited distance by reason of fluid bye-passing thru valve 48, whereupon, if the extraneous forces are not too great the movement of the wheel will be checked by the admission of high pressure to the chamber which is then decreasing in volume. If however, these extraneous forces are severe, further necessary movement, under increased restraint will be permitted by reason of the wheel 15 and plunger 38 acting in opposition to fluid pressure and actually forcing fluid backwardly from left turn chamber 40 thru conduit 74, left turn branch 71, left turn port 79, high pressure port 77, valve bonnet port 76, high pressure inlet branch 69, and high pressure relief valve into the receiver 64. At the same time that the right-turning wheel is so moving fluid, the increasing volume right-turn chamber is connected so that fluid is drawn from the receiver 64 thru the corresponding ports and conduit into the right turn chamber so that a partial vacuum is not created.

Under the conditions last described, when the extraneous forces have subsided to a certain degree then the back pressure set up thereby is released; the bye-pass valve closes and the normal high pressure produced by the pump and determined by said relief valve becomes effective in "pumping"; the plunger and wheel back toward dead ahead position. Just before such position is reached however, the links 56 and 57 and bar 59 will have acted to close the valve but the tendency of the properly castered wheel combining with the urge of the centering mechanism, and the bye-pass port 48a will result in the wheel voluntarily straightening out.

While the combination of parts described provides for automatic but snubbed castering, and provides for limiting the degree of castering, and for increasing the actual snubbing action according to degree to which the wheel is forced by extraneous forces, the combination applies mainly to landing or to taking off under some conditions, but it does not provide for voluntary steering on the part of the pilot, such as when taxiing, or such as when in the pilots judgment it is advisable to willfully oppose to any degree the castering tendencies of the wheel 15 or the lateral inertia of an airplane landing with sidedrift or in a cross wind.

For these latter conditions I provide manually controlled steering such as that set forth in the application Serial No. 264,395, and particularly where the power required for such steering is more than a man can readily develop in the time required. However, in keeping with objects of the invention, I provide that steering of the wheel 15 shall be accomplished by the act of manipulating the rudder so that no added thought or effort is required on the part of the pilot in landing, taxiing or takeoff, and whereas in certain craft the hydraulically snubbed castering wheel may be indirectly controlled satisfactorily thru the reaction of the rudder, there are other craft which require more positive control over the wheel 15.

Such positive control is provided by combining with the parts heretofore described, means for moving the pivot 91 of bar 59, thru movement of rudder or rudder bar 50. However it will be understood that aircraft, as compared with vehicles, should be even more carefully steered and that the wheel 15 when dirigible should be turned rather cautiously under some conditions. By moving the pivot slowly and carefully the airplane described may be turned as slowly and positively as desired, whereas it is the custom for a pilot to move a rudder rather suddenly and, frequently the rudder is kicked from one extreme position to the other in short order. Accordingly, I provide parts now to be described. The pivot 91 is carried by a crank 92 having a vertical pin 92a mounted to turn in a bearing 93 supported by a transverse brace 94 of the nose frame. Where this pin 92a projects below the bearing 93 it is provided with an integral annular cam 95. A second cam 96 cooperating with 95 is mounted to turn on pin 92a although this cam 96 is held against cam 95 by a compression spring 97. This spring is held compressed by a collar 97a carried below the spring by pin 92a. The cam 96 is provided with an integral arm 98 for oscillating same around pin 92a, and this arm is connected to the rudder bar by a push-and-pull rod 99. Rod 99 is provided respectively with a pivot 100 where it connects with the rudder bar, a pivot 101 where it connects with the arm 98, a universal joint 102 positioned to allow the rod to bend slightly with movement of the nose frame, and, the rod is provided with guides such as 103.

In describing the operation of the complete assembly an extreme condition will be assumed in order to more fully show the great flexibility and adaptability of the entire combination. It will be assumed for example that the wheel 15 has been turned well to the right for a right-hand turn by the rudder bar having been moved for a right-turn and that pivot 91 is then in such position that as the wheel 15 nears the extreme right hand position the valve lever 86 moves to neutral or closed position to stop further travel. Under such conditions the bar 59 and pivot 91 and the rudder bar would all be in the position shown in broken lines in Figure 4. Now the pilot suddenly moves the rudder bar toward neutral position and over to the extreme left turn position. This would move the pivot 91 rearwardly and when the rudder had reached neutral position or thereabouts the valve lever 86 would have been moved rearwardly to where it would be stopped by its corresponding stop with the inlet port 77 in registration with the leftturn port 79. Such position of the pivot, the bar and the valve disc is shown in full lines in Figure 5. As the rudder bar continued over to extreme left-turn position the cam 95 would turn relative to cam 96 and would be forced to ride downwardly on the pin 92a to compress the spring and store energy therein. With the ports 77 and 79 so registered the pump acts to pump fluid into the left-turn chamber of the cylinder, while the right-turn chamber is now being vented, and the wheel 15 would be moved toward the left. As the wheel moves toward the left it acts thru links 56 and 57 and bar 59 to move the valve stem forward but immediately the valve stem tends to so be moved the cams 95 and 96 will co-operate to further move the pivot 59 rearwardly. Such action will continue until the wheel 15 has reached neutral or dead-ahead position and ports 77 and 79 of the valve would still be in registration, all parts being then set for a full left turn of wheel 15. As the pump continued to force fluid into the left-turn chamber and as the wheel 15 moved from neutral toward the left; the pivot 91 being now stationary, the links would begin to act to close the valve so that just before the wheel 15 reached the extreme left turn position flow of high pressure fluid into the left-turn chamber would have been discontinued. The position which the parts have now taken is shown in broken lines in Figure 5.

Figure 4:
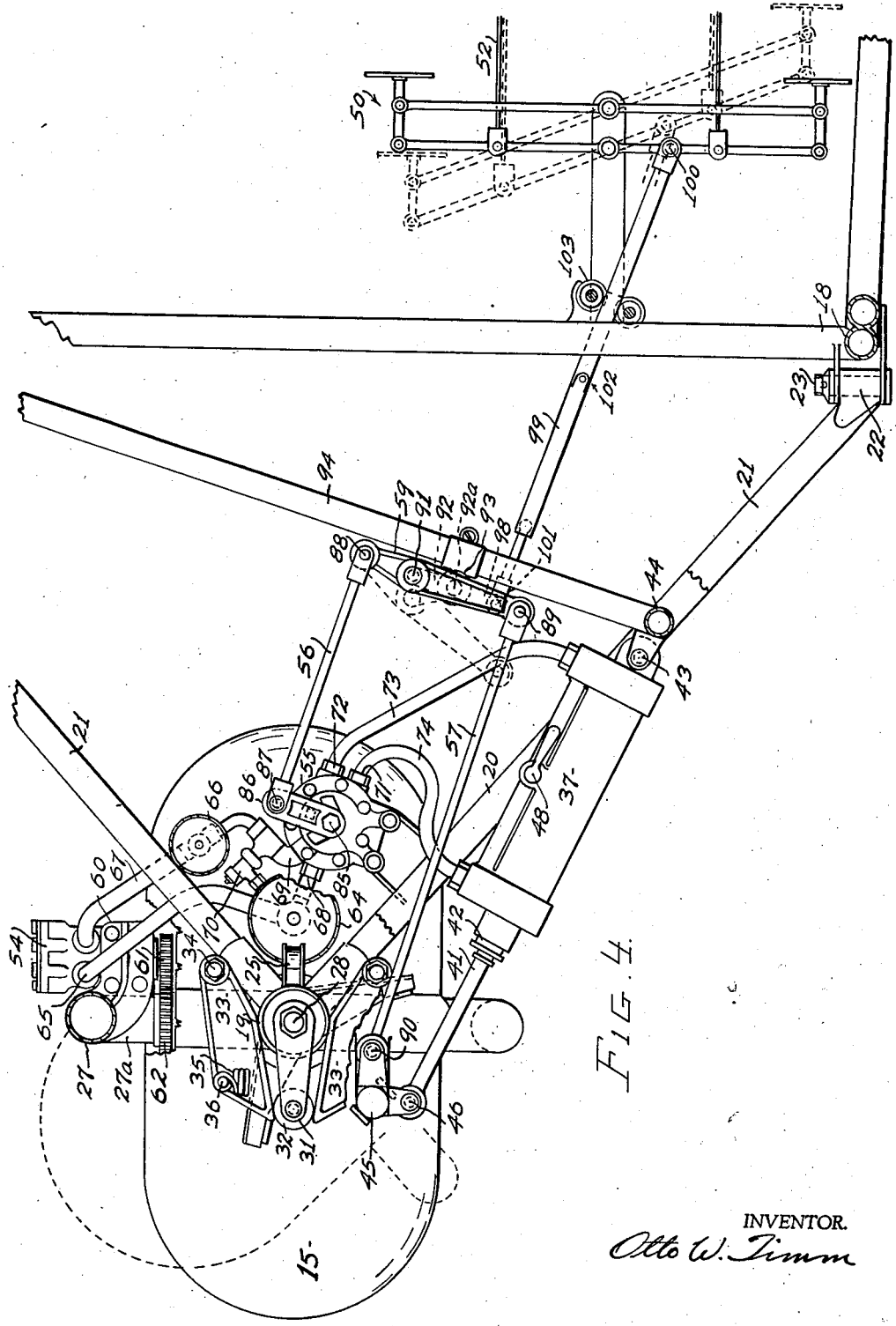
Figure 4 is a plan view of the parts shown in Figure 3.

Of course at any time this left turning movement of the wheel may be again interrupted or reversed by correspondingly moving the rudder. Thus, either before or after a complete left turn is accomplished, the pilot may release the rudder and allow it to take neutral position, or may move the rudder bar to neutral and hold it there. In such case the pivot 59 would move to the exact full line position in which it is shown in Figure 4 thereby moving the valve disc to register port 77 with right turn port 78 whereupon the wheel 15 would be pumped back toward neutral and the ports would be closed off only as the wheel 15 neared neutral again.

It will be apparent now that despite sudden movements of the rudder, movement of the wheel 15 is slower but positive. This delayed action of the part of a dirigible wheel steered indirectly thru a rudder control, is most important and makes it feasible now to so control an airplane on the ground. As soon as the airplane leaves the ground the pump stops operating and the rudder controls are no longer effective on the hydraulic steering mechanism, and the centering device will move the wheel 15 to dead-ahead position. Just before landing, the pilot may, if conditions permit or require, set the rudder to a given position and thus predetermine the direction in which the wheel will turn as soon as the pump goes into operation.

The original adjusted setting of the high pressure relief valve 70 is important in connection with manually controlled steering for it prevents the possibility of turning the dirigible wheel too rapidly. For a given airplane the safe rate at which the wheel 15 may be turned is predetermined first, then pump, relief valve and cylinder bore are all co-ordinated so that at all but very slow taxiing speeds the pump will build up enough pressure to keep the high pressure relief slightly open. This insures a constant hydraulic pressure at all times. In an airplane where the valve ports are opened fully and suddenly the port area is known, and the hydraulic pressure is predetermined and constant at all but very low speeds, the time required for the wheel 15 to turn a given number of degrees is predetermined so that a turn will never be made too suddenly no matter how fast the airplane may be rolling, and at the same time the relief valve is so set that should steering be neglected the wheel may caster to a considerable degree, if required by reason of extreme forces acting other than axially of the airplane as a whole.

All steering operations may be summed up by saying that for any position into which the rudder is moved there is a corresponding position to which the pivot 91 is thereby moved, and for any given position of the pivot (other than neutral) the rolling wheel 15 will act to pump fluid to move itself to a corresponding angle whereupon it will act to close off supply of hydraulic fluid and will normally be held hydraulically snubbed in such position until the rudder bar is again moved, altho provision is made that the wheel 15 while positively moved will be moved always at a safe rate regardless of how suddenly the rudder may be moved. The invention provides however that should the rudder bar be moved to a given position and then moved back again the dirigible wheel is not required to complete the corresponding movement before being returned to neutral. In other words, while the rudder may be used even erratically to produce a certain average turning effort, the dirigible wheel will move more slowly at a predetermined rate and produce the same average turning effort forwardly as the rudder is calculated to produce aft, and, if the rudder should not be used at times the described combination still provides a hydraulically snubbed automatically castering wheel, which wheel if castering to more than a predetermined degree under severe extraneous impulses, will be automatically "pumped" back toward neutral as soon as such forces have subsided.

The invention assures that the airplane will land with the wheel dead-ahead but once reaching a landing surface will either travel automatically, or at the will of the pilot may be constrained to travel, in the direction in which it landed rather than in the direction represented by the fore and aft axis, and as soon as it is wise to do so it may then be positively steered as accurately and with as little effort as any light weight vehicle, even though the airplane be a huge transport. This application is in part a divisional part of application Serial No. 264,395.

I claim:

1. In an airplane, a body, a single central dirigible landing wheel forwardly of the center of gravity thereof, a pair of spaced directionally stable landing wheels to the rear of the center of gravity of said body, means acting to hold the dirigible wheel hydraulically locked in directionally stable position when landing, and steering means operable upon contact of the landing wheel with a landing surface to release said first named means and to change the direction of said wheel.

2. In an airplane a rudder, a landing gear including a dirigible wheel, steering means for operating said rudder and dirigible wheel coordinately when the wheel is in contact with a landing surface, and means operating, when the dirigible wheel is lifted from contact with a landing surface, to render said steering means ineffective upon said wheel.

3. In an airplane a rudder, a landing gear including a dirigible wheel, steering means for operating said rudder and dirigible wheel coordinately when the wheel is in contact with a landing surface, and means operating, when the dirigible wheel is lifted from contact with a landing surface, to render said steering means ineffective upon said wheel; and other means then operating automatically to move said wheel to dead-ahead position independently of the position of said rudder.

4. In an airplane, a landing gear embodying a dirigible wheel, a rudder, a rudder bar normally operative only on said rudder, means acting to centralize said wheel when in flight, and means operable upon contact of the landing wheel with the ground to then turn the dirigible wheel directionally in accordance with the position of the rudder.

5. In an airplane landing gear a dirigible wheel for influencing direction of travel on a landing surface, hydraulic steering means for said landing wheel embodying means normally locking said wheel in any preselected directional position against sudden turning forces; said means slowly responsive to continued force to allow the wheel to turn, and resilient centering means for said wheel.

6. In an airplane landing gear, a dirigible wheel, a control member movable in flight to indicate the direction toward which the dirigible wheel shall turn, power means operative upon contact of the wheel with a landing surface to so turn the wheel, and means operating to discontinue operation of said power means when the wheel shall have turned in the indicated direction.

7. In an airplane a rudder, a landing gear including a dirigible wheel, steering means for operating said rudder and dirigible wheel coordinately when the wheel is in contact with a landing surface, and means operating, when the dirigible wheel is lifted from contact with a landing surface, to render said steering means ineffective upon said wheel, said securing means embodying a hydraulic lock for said wheel yieldable to prolonged exterior turning forces.

8. In an airplane landing gear, a hydraulic plunger, a dirigible landing wheel connected to be moved by and with said plunger, a cylinder enclosing said plunger, means normally locking fluid in both ends of said cylinder to substantially lock said wheel against being turned by extraneous forces, said means providing a small bye-pass whereby prolonged forces may slowly move said wheel, resilient centering means for said wheel, a source of high pressure fluid, means normally disconnecting said source of fluid from said cylinder when the landing wheel is not in contact with a landing surface, and means operable only when the wheel is in contact with a landing surface for releasing fluid from one end of said cylinder while admitting high pressure fluid from said source to the other end of said cylinder.

9. In an airplane a cabin, wings mounted high relative to said cabin, a pair of spaced directionally stable landing wheels below said cabin to the rear of the center of gravity, a central dirigible landing wheel, a frame supporting said wheel forwardly of and below said cabin whereby the cabin assumes a level attitude on a landing surface and the weight imposed on said dirigible wheel is so great that an operator is incapable of developing enough power in the time required to directionally turn the dirigible wheel, power driven means for directionally turning said wheel, a manually operated control for applying power to said wheel; said control operating to discontinue application of power when the wheel shall have turned directionally as required.

10. The airplane as in claim 9 and further including means for rendering said power driven means ineffective on said wheel when the wheel is lifted from contact with the ground.

11. The airplane as in claim 9 and further including means for rendering said power driven means ineffective on said wheel when the wheel is lifted from contact with the ground; means operating automatically in flight to center said wheel and means holding said wheel locked in dead-ahead position until the landing wheel shall have contacted the landing surface.

12. In an airplane, a cabin, wings mounted high relative to said cabin, a pair of engines mounted forwardly of said wings, a frame projecting forwardly of said cabin and pivotally supported thereto, a shock absorber interposed between said frame and said cabin, to snub pivotal movement of said frame, a dirigible landing wheel supported by said frame, other landing wheels to the rear of the center of gravity of the airplane as a whole and cooperating with said dirigible wheel to hold the airplane in approximately level cruising position on a landing surface, a rudder rearwardly of said cabin and disposed in the stream of air from said propellers, and power driven means for turning said wheel when same is in contact with a landing surface.

13. The combination as in claim 12 and further including rudder operating means comprising control means for said power driven means.

14. In an airplane cabin, wings mounted high relative to and toward the front of said cabin, a pair of engines spaced one to each side of said cabin each mounted in the corresponding wing, a propeller forwardly of and driven by each engine describing discs which are spaced a distance less than the width of the cabin, a nose-frame pivoted forwardly to said cabin and below the swept-disc areas of said propellers, a pair of spaced landing wheels under said wings rearwardly of the center of gravity of the airplane, a dirigible landing wheel supported at the forward end of said nose-frame whereby the airplane assumes a level attitude on a landing surface and a weight is imposed on said dirigible wheel such that an operator cannot develop sufficient power in the time required to directionally move said dirigible wheel, a hydraulic cylinder fixed to said frame, a steering arm to said wheel, a plunger enclosed by said cylinder, a plunger rod to said plunger extending from said cylinder and connected to said steering arm, valvular means normally locking hydraulic fluid in each end of the cylinder to lock the dirigible wheel from being suddenly turned by extraneous forces, a source of fluid under pressure, and steering means including manual means for operating said valvular means to release fluid from one end of said cylinder while admitting high pressure fluid to the other end of said cylinder.

15. The airplane as in claim 14 and further including a rudder to the rear of said cabin mounted high to be disposed in the stream from said propellers, rudder operating means comprising said manual means, and means operating when the dirigible wheel is lifted from a landing surface for discontinuing supply of high pressure fluid.

16. In an airplane landing gear a castering wheel, a hydraulic cylinder, a plunger in said cylinder dividing same into a right-turn chamber and a left-turn chamber respectively, a plunger rod to said plunger connected to directionally turn said castering wheel, means for forcing hydraulic fluid into either chamber selectively while venting the other chamber, a restricted bye-pass connecting said chambers at all times and a pressure relief valve operable to vent fluid from a chamber into which said last named means is then forcing fluid when the wheel is subject to excessive force tending to caster it in a direction opposed to that in which it is being turned.

17. In an airplane, wings, a landing gear embodying a plurality of wheels arranged to hold the airplane in substantially level cruising attitude on a landing surface; one of said wheels being forward of the center of gravity and being so disposed and so resiliently mounted as to raise the forward portions of the airplane to increase the angle of attack of said wings as the airplane increases speed whereby take-off is effected automatically.

18. In an airplane landing gear embodying a dirigible wheel, a pair of opposing spring-pressed means tending to keep the wheel in dead-ahead position, and means for each spring-pressed means acting to render the corresponding spring-pressed means immediately and totally inoperative when said wheel shall have been moved appreciably off center away from same comprising a fixed stop between the opposing spring-pressed means.

OTTO W. TIMM.